United States Patent [19]

Crawford

[11] 3,900,530

[45] Aug. 19, 1975

[54] METHOD FOR FORMING GRAFT COPOLYMERS EMPLOYING THE REACTION PRODUCT OF HYDROGEN PEROXIDE AND ETHYLENE-ACRYLIC ACID ALKALI SALT COPOLYMERS

[75] Inventor: James E. Crawford, Adrian, Mich.

[73] Assignee: Owens-Illinois, Inc., Toledo, Ohio

[22] Filed: Apr. 1, 1974

[21] Appl. No.: 456,653

[52] U.S. Cl. .......................... 260/877; 260/878 R
[51] Int. Cl. .......................................... C08f 15/00
[58] Field of Search ...................... 260/877, 878 R

[56] References Cited
UNITED STATES PATENTS

| | | | |
|---|---|---|---|
| 3,037,952 | 6/1962 | Jordan, Jr. et al. | 260/29.6 |
| 3,238,169 | 3/1966 | Wolff | 260/29.6 |
| 3,321,408 | 5/1967 | Briggs | 252/161 |
| 3,801,523 | 4/1974 | Shiratsuchi et al. | 260/29.6 |

FOREIGN PATENTS OR APPLICATIONS

| | | | |
|---|---|---|---|
| 937,492 | 9/1963 | United Kingdom | 260/29.6 |
| 539,277 | 4/1957 | Canada | 260/29.6 |

Primary Examiner—Joseph L. Schofer
Assistant Examiner—A. Holler
Attorney, Agent, or Firm—Robert F. Rywalski; Edward J. Holler

[57] ABSTRACT

A process is set forth for forming graft copolymers wherein an alkali metal salt of an ethylene-acrylic acid copolymer is combined with acrylonitrile, and prescribed optional monoethylenically unsaturated polymerizable monomers, after which hydrogen peroxide is released into the system to form a free radical polymerization specie with the salt. The method may be thought of as preceeding along the lines of hydrogen peroxide reacting with the ethylene-acrylic acid alkali salt copolymer so as to form a copolymeric alkali persalt; the persalt then, through the peroxide linkage, serves as a free radical initiator to homopolymerize acrylonitrile or to copolymerize acrylonitrile and the prescribed optional monomers thereto so as to form graft polymers.

19 Claims, No Drawings

METHOD FOR FORMING GRAFT COPOLYMERS EMPLOYING THE REACTION PRODUCT OF HYDROGEN PEROXIDE AND ETHYLENE-ACRYLIC ACID ALKALI SALT COPOLYMERS

The present invention relates to polymerization methods and, more particularly, it relates to aqueous polymerization wherein graft thermoplastic polymers are formed. More specifically, the present invention is directed to a peroxidic, free radical graft polymerization process so as to form graft polymers of acrylonitrile onto a backbone of ethylene-acrylic acid or, perhaps more accurately, onto an ethylene-acrylate backbone.

In accordance with this invention, there is provided a process for producing graft polymers which comprises combining, in water, a water soluble copolymeric alkali metal salt of ethylene-acrylic acid with acrylonitrile and, optionally, a monoethylenically unsaturated polymerizable monomer selected from the group consisting of lower alkyl acrylates, lower alkyl methacrylates, vinyl aromatics, vinylidene halides, vinyl halides, and mixtures thereof, after which hydrogen peroxide is released into the combination in an amount sufficient to form a free radical initiator with the copolymeric alkali metal salt; the system is then polymerized, with the sole free radical polymerization initiator consisting of the reaction product of the hydrogen peroxide and the copolymeric alkali metal salt, for a time and at a temperature sufficient to graft polymerize the acrylonitrile and, when present, the optional monoethylenically unsaturated monomer after which the polymer product is recovered by conventional techniques.

In accordance with a further feature of this invention, there is provided a process for forming graft polymers which comprises combining acrylonitrile and a $C_1$ to $C_2$ acrylate, a $C_1$ to $C_2$ alkyl methacrylate, styrene, vinyl chloride, vinylidene chloride, or mixtures thereof, in water with a water soluble alkali metal salt of an ethylene-acrylic acid copolymer, after which there is added, to that combination, hydrogen peroxide in an amount sufficient to form a radical initiating specie with the salt; this is followed by the graft polymerization of the monomers, wherein the sole initiator consists of the reaction product of said hydrogen peroxide and said alkali metal salt.

According to a still further feature of this invention, a graft polymer is formed by reacting a copolymer of ethylene-acrylic acid with sodium hydroxide so as to form a water soluble neutralization product; combining at least part of the neutralization product with acrylonitrile and, optionally, a monomer selected from $C_1$-$C_2$ alkyl acrylates, $C_1$-$C_2$ alkyl methacrylates, styrene, or mixtures thereof in water so as to form an aqueous polymerizable system which consists essentially of the neutralization product, acrylonitrile and, when present, the aforementioned monomer or monomers as the reactants in the amounts of about 8 to about 60 weight percent neutralization product, about 4 to about 80 weight percent acrylonitrile and 0 to about 88 weight percent of the aforementioned monomer or monomers, the amount of these reactants being selected in these ranges to total 100 weight percent; adding hydrogen peroxide to this combination and allowing the acrylonitrile and the other monomer(s), if present, to graft polymerize with the sole polymerization initiator consisting of the reaction product of the hydrogen peroxide and the neutralization product, followed by a recovery of the polymerized product.

The reaction product graft polymers formed in accordance with this invention will be referred to hereinafter, as a polyacrylonitrile acrylate-ethylene graft copolymer, or polymeric acrylonitrile acrylate-ethylene graft copolymer. The polyacrylonitrile or polymeric acrylonitrile terminology comprehends both the formation of homopolymeric acrylonitrile grafts, as well as copolymeric grafts of acrylonitrile along with the other monomers i.e., lower alkyl acrylates, lower alkyl methacrylates, vinyl aromatics, vinylidene halides, vinyl halides, or mixtures of the latter monomers. In the actual reaction it is believed that the copolymeric alkali metal salt of ethylene-acrylic acid reacts with hydrogen peroxide to form a copolymeric alkali metal persalt, which persalt then decomposes and functions as a free radical to effect the polymerization of acrylonitrile, or acrylonitrile and the other prescribed monomers, onto the pendent group thereof; that is, it is believed that the copolymeric or homopolymeric grafts of acrylonitrile form onto the oxygen atom which is attached to the carbonyl group, this oxygen atom apparently being an active free radical initiating site.

The copolymeric alkali metal salt of ethylene-acrylic acid employed in this invention may be manufactured in a manner well known in the art. For example, a copolymer of ethylene and acrylic acid may be reacted with an appropriate alkali metal compound, such as a hydroxide or oxide, to form the copolymeric alkali metal salt. Exemplary of the alkali metals are sodium and potassium with exemplary compounds being the oxides or hydroxides thereof, sodium hydroxide being especially highly preferred. The amount of the alkali metal compound, for example the hydroxide or oxide, employed will be routinely selected by those skilled in the art, the amount being sufficient, however, so as to form a water soluble alkali metal neutralization product of the ethylene-acrylic acid copolymer. The amount of the alkali metal compound employed, for example, sodium hydroxide, may be an amount calculated to produce a full neutralization product or a partial neutralization product. Exemplary amounts that may be employed are about one-half (0.5) equivalents, of the alkali metal compound per equivalent of acid in the copolymer, up to one equivalent, of alkali metal compound, for example, hydroxide, per equivalent of acid. The former will produce an approximately 50 percent neutralized product, and the latter, of course, will produce a substantially 100 percent neutralized product. Excellent results will be obtained by employing a water soluble alkali metal salt of ethylene-acrylic acid which has been produced by reacting an alkali hydroxide, for example, sodium hydroxide, with an ethylene-acrylic acid copolymer in an amount calculated to produce a neutralization product which is between about 85 percent to about 100 percent theoretically neutralized. The ethylene-acrylic acid copolymer will be routinely selected by those skilled in the art so that it forms a copolymer alkali metal salt of ethylene-acrylic acid which is water soluble. Usually it is preferred to employ an ethylene-acrylic acid copolymer which contains in excess of about 15 or 16 weight percent of acrylic acid with excellent results being obtained by employing commercial available ethylene-acrylic acid copolymers containing from about 75 to about 82 weight percent ethylene and about 18 to about 25 weight percent of acrylic acid. Exemplary of such copolymers are those having melt indexes in the range of about 25 to about 500 or number average molecular weights in excess of about 3,000.

The water soluble copolymeric alkali metal salt of ethylene-acrylic acid is then combined in water with acrylonitrile alone or, optionally, with acrylonitrile and a monoethylenically unsaturated polymerizable monomer selected from the group of lower alkyl acrylates, lower alkyl methacrylates, vinyl aromatics, vinylidene halides, vinyl halides, or mixtures thereof. Acrylonitrile is capable of forming the graft polymers as contemplated herein when it is the sole monomer, or acrylonitrile when it is combined with the other aforementioned monomers is capable of forming a copolymeric type of graft as contemplated herein. In passing, however, it should be mentioned that experiments indicate that if acrylonitrile be omitted and the foregoing, or other polymerizable, monomers attempted to be employed for graft polymerization, virtually no graft polymerization will be effected. Similarly, experiments have indicated that if acrylonitrile is present and monomers, other than the aforementioned optional monomers, are employed in a significant amount there is a danger that these other monomers will inhibit polymerization severely, if not in its entirety. Similarly, if acrylonitrile and one of the foregoing optionally recited monothylenically unsaturated polymerizable monomers are employed and monomers other than those prescribed are also employed, experiments indicate there is likewise a danger of polymerization inhibition from these other monomers. Thus, it is contemplated in the present invention there will be combined in water, with the water soluble alkali metal salt of ethylene-acrylic acid, acrylonitrile and optionally, that is along with the acrylonitrile, lower alkyl acrylates, lower alkyl methacrylates, vinyl aromatics, vinylidene halides, vinyl halides, or mixtures of these monomers. If ethylenically unsaturated free radical polymerizable monomers are employed in addition to acrylonitrile and the optional monomers set forth hereinbefore, they will be selected and employed in a minor amount, that is, an amount insufficient to preclude the desired polymerization and the formation of the desired polymeric acrylonitrile acrylate-ethylene graft polymers. If, in addition to acrylonitrile and the optional monoethylenically unsaturated polymerizable monomers set forth above, there is employed another free radical polymerizable ethylenically unsaturated monomer, it is generally preferred that this monomer be used in an amount of less than about 10 weight percent, based on a total reactant charge consisting of the copolymeric alkali metal salt, acrylonitrile, the optionally prescribed monomer(s) and this other free radical polymerizable ethylenically unsaturated monomer. Thus, essentially the method comprises the steps previously set forth and if an additional olefinically unsaturated free radical polymerizable monomer is employed it will not be used in an amount which will preclude the desired polymerization and formation of the graft polymers.

Representative of the lower alkyl acrylates and lower alkyl methacrylates suitable for use as the optional monoethylenically unsaturated polymerizable monomer are the $C_1$ to $C_8$ alkyl acrylates or methacrylates such as, for example, methyl acrylate, methyl methacrylate, ethyl acrylate, ethyl methacrylat, butyl acrylate, butyl methacrylate, 2-ethyl-hexyl methacrylate and 2-ethyl-hexyl acrylate. It is preferred, however, that the lower alkyl acrylates or methacrylates be the $C_1$ or $C_2$ alkyl methacrylates or acrylates. Exemplary of the vinyl aromatic compounds include styrene, which is preferred, as well as styrene having substituents on the aromatic group, such as, for example, o, m, or p vinyl toluene, t-butyl styrene, chlorostyrenes, and like lower alkyl or halo substituted styrenes. The preferred vinylidene halides and vinyl halides will be vinylidene chloride and vinyl chloride.

After the acrylonitrile and, optionally, the monoethylenically unsaturated monomers set forth above have been combined with the copolymeric alkali metal salt of ethylene-acrylic acid, hydrogen peroxide is then released into the water system in an amount sufficient to form a free radical initiator with the copolymeric alkali metal salt. Experiments have shown that if the hydrogen peroxide is combined with the copolymeric alkali metal salt or ethylene-acrylic acid prior to the addition of the monomers (acrylonitrile or acrylonitrile and the recited optional monoethylenically unsaturated monomers) a significant adverse effect is realized. In fact, in most instances, no polymerization will result. Thus, it is preferred to add hydrogen peroxide subsequent to combining the desired monomers with the alkali metal salt of the ethylene-acrylic acid copolymer in the water system. Apparently, the reaction product of the copolymeric alkali metal salt and hydrogen peroxide is of a short life and is dissipated and becomes inert relatively quickly, unless the hydrogen peroxide is released subsequent to having the entire system ready for polymerization and awaiting only activation with the hydrogen peroxide. In passing, and as used herein, terminology that polymerization is effected with the sole initiator or sole free radical initiator being the reaction product of hydrogen peroxide and the copolymeric alkali metal salt, there is contemplated using as the polymerization specie only the reaction product of the essential ingredients or constituents as described herein. For example, that terminology excludes the addition of other free radical initiators which would tend to form a substantial amount of homopolymeric material in the system and, likewise, excludes the addition of other materials such as, for example, acyl halides or alkyl haloformates or alkyl halocarbonates which can react under these conditions to form a different polymerization specie which specie will produce homopolymers in addition to graft copolymers. Generally, the amount of hydrogen peroxide employed will be an amount sufficient to form a free radical initiator with the copolymeric alkali metal salt of ethylene-acrylic acid. This amount may be varied and will be routinely selected by those skilled in the art depending on the materials employed. In a highly preferred practice of this invention an ethylene-acrylic acid copolymer will be neutralized by employing a sufficient amount of the alkali metal compound to theoretically effect about 85 to 100 percent neutralization and the amount of hydrogen peroxide employed will be at least about equivalent to the number of moles of alkali metal compound employed and preferably will be in excess thereof, for example, up to as much as a molar ratio of hydrogen peroxide to alkali metal compound employed of 2:1 or 3:1. Thus about 1 to about 2 moles of hydrogen peroxide per mole of alkali salt moiety in the copolymer is convenient. Excellent results are obtained by using sodium hydroxide in amounts sufficient to theoretically neutralize all of the acid groups of the ethylene-acrylic acid copolymer and then employing hydrogen peroxide in a mole ratio of about 1:1 to about 2:1 based on the sodium hydroxide employed.

The amount of the copolymeric alkali metal salt employed as well as the acrylonitrile and, optionally, either lower alkyl acrylats, lower alkyl methacrylates, vinyl aromatics, vinylidene halides, vinyl halides, or mixtures of these monomers may be varied and will be routinely selected by those skilled in the art, so as to be present in amounts sufficient to allow polymerization. Suitable exemplary amounts which will be employed to produce desirable results (when considering the weight of the copolymeric alkali metal salt, acrylonitrile, and the prescribed optional monoethylenically unsaturated monomers as the entire or 100 percent reactant system) will be about 8 to about 60 weight percent of the copolymeric alkali metal salt, about 4 to about 80 weight percent acrylonitrile, and about 0 to about 88 weight percent of either a lower alkyl acrylate, a lower methacrylate, a vinyl aromatic compound, a vinylidene halide, a vinyl halide, or mixtures thereof. The amounts, as indicated above, being selected in these ranges so that the copolymeric salt, acrylonitrile and monomer(s) total about 100 percent. As will be readily apparent, because of the wide variation which may be employed in the ingredients, the novel method of this invention is capable of producing a wide range of graft polymeric products. It will thus, of course, be readily appreciated that these products have a wide range of utilities. The polymeric acrylonitrile acrylate-ethylene graft copolymers produced by the method of this invention include copolymers having utilities as elastomers, film formers, coating materials, and copolymers suitable for the fabrication of various articles of commerce, for example, by compression molding and the like. Copolymers may be produced which have good resistance to oxygen permeability and, thus, will find utilization as protective envelopes for oxygen sensitive materials. Exemplary polyacrylonitrile acrylate-ethylene graft copolymers of that type are produced by employing about 8 to about 25 percent by weight of the copolymeric alkali metal salt of ethylene-acrylic acid, about 60 to about 80 percent by weight of acrylonitrile and about 5 to about 25 percent by weight of one of the prescribed optional monomers, for example, a lower alkyl acrylate, like ethyl acrylate or methyl acrylate, a lower alkyl methacrylate, like methyl methacrylate or ethyl methacrylate styrene or mixtures thereof. The amounts are selected in the ranges stated with the total of copolymeric alkali metal salt, acrylonitrile and the monomer(s) being about 100 percent.

Those skilled in the art will routinely determine the time and temperature employed in forming graft polymers by the method of this invention. Normally, the reaction is done by simply combining the ingredients and allowing the reaction to proceed as evidenced by an exotherm. For example the ingredients may be added at about room temperature and after a slight period of time, for example, on the order of about 10 to about 30 minutes an exotherm will result. Maintaining the reaction temperatures below about 70°C (by use of external cooling) will be quite convenient and will produce excellent results, with the completion of the reaction being determined by the system cooling by itself after external cooling has been discontinued. It will be quite desirable to effect the polymerization in a system which has a concentration similar to conventional emulsion or suspension polymerization systems, that is, the concentration of the copolymeric alkaline metal salt and the monomers employed relative to the total weight of the system will, generally, be less than about 35 percent by weight and, preferably, in the range of about 18 to 25 percent. Advantagously, the pH of the system will be alkaline and in the range of about 10 to 11, but this range does not appear to be critical. Finally, in passing, it should be mentioned that in employing the copolymeric alkali metal salt of ethylene-acrylic acid there will be no need to add to the system additional emulsifiers, or surfactants, as is conventional practice with emulsion or suspension polymerization. That is, the ethylene-acrylic acid copolymeric alkali salt functions both as an emulsifier, or surfactant and as a reactant. If desired, suitable adjuvants may be added to the system but, as indicated before, other free radical initiators, or the addition of other materials, such as, acyl halides, or alkyl haloformates, or halocarbonates which react under these conditions to form other polymerizing species will be avoided.

While the foregoing sets forth the present invention with sufficient particularity to enable those skilled in the art to make and use the invention without an undue amount of experimentation, and sets forth the best mode contemplated in practicing the present invention, specific examples follow which will even still more clearly exemplify the present invention.

EXAMPLE I

In U.S. Pat. Nos. 2,911,398, and 2,837,496, there are disclosed techniques which are said to be capable of producing graft copolymers wherein a polymer hydroperoxide is first employed and then this hydroperoxide is then used for further polymerization. These two patents teach the use of oxygen to form the hydroperoxide although U.S. Pat. No. 2,837,496, Column 13, at about lines 35–45 indicates that hydrogen peroxide may be employed when polymers having ketone groups or alcohol groups are used.

The following experiments were run generally along the lines of Example 53 of U.S. Pat. No. 2,837,496, but a copolymer of ethylene and acrylic acid was used. The specific copolymer used had the following properties: 19 weight percent acrylic acid, a melt index of 50 (ASTM-D 1238-52T) and a DTA melting point of 95°C. This material is commercially available from Union Carbide & Chemical Company under their designation EAA–9300.

To a nitrogen purged resin flask was added 39.55 milliliters of a 20 percent by weight water solution of a water soluble sodium salt of the ethylene-acrylic acid copolymer. The salt was produced by reacting sodium hydroxide with the ethylene-acrylic acid copolymer, with the amount of sodium hydroxide employed being sufficient to form a water soluble salt and in this instance the amount of sodium hydroxide was 100 percent of the theoretical stoichiometric amount needed for complete neutralization of the acid functionality. There was then also added 0.38 grams of potassium persulfate, 55.6 milliliters of water, 21.1 grams of tertiary-butyl alcohol. The reactants were then reacted at 65°C for about 43 hours with a continual flow of oxygen bubbling through the system. Acetic acid was then added to precipitate a product and the contents were then filtered, washed, reslurried in water, and the cycle again repeated twice. The separate solids were then dried in an oven at room temperature and produced a product which weighed 6.98 grams (hereinafter referred to as a "hydroperoxide" product). Five grams of this dried hydroperoxide product was then placed in a resin flask to which was added 5 grams of styrene, 57 ml of water, 1.5 grams of sodium hydroxide, 0.0046 grams of $FeSO_4·9H_2O$, 0.0375 grams of sodium pyrophosphate, and 0.25 grams of dextrose. The air was removed from the reactor, replaced with nitrogen and the contents then reacted at a temperature of about 30°C for about 4 hours. After this time dilute HCl was added to coagulate the reaction product, which was then thoroughly washed, filtered, and dried in an air oven at 50°C. The dried product weighed 4.96 grams and it will be noted that 5 grams of the initial "hydroperoxide" product was employed. The product weighing 4.96 grams was compression molded and then analyzed by conventional infrared techniques. Infrared showed that the product contained no form of polymerized styrene, thus indicating that no graft polymerization was accomplished and, likewise, indicating that the styrene itself had not polymerized. Thus, the foregoing indicates that if one substitutes an alkali metal salt of an ethylene acrylic acid copolymer for the copolymer of p-isopropanol-α-methylstyrene and methacrylic acid of U.S. Pat. No. 2,837,496, no apparent polymerization is realized.

EXAMPLE II

To a properly equipped nitrogen purged resin flask were added 50 ml of a 20 percent by weight solution in water of a water soluble sodium salt of a copolymer of ethylene and acrylic acid (prepared as in Example I). Twenty grams of acrylonitrile and 20 grams of methyl methacrylates were also added. Air was bubbled into the system and the contents were allowed to react at room temperature for 24 hours. The product was acidified with HCl, filtered, washed, and air dried. 9.89 grams of a product was recovered; an infrared analysis of a compression molded film of the composition showed that no acrylonitrile or methyl methacrylate had apparently polymerized. Thus, this indicates that air, unlike the hydrogen peroxide employed in the present invention, does not form a free radical initiating specie.

In a similar manner, the procedure was repeated with the exception that oxygen was bubbled through the system. A product weighing 9.70 grams was recovered and an infrared analysis, as with the above, indicated that no acrylonitrile or methyl methacrylate had polymerized.

The foregoing shows that unlike the teachings of U.S. Pat. Nos. 2,837,496 and 2,911,398, if oxygen or air is employed in the present invention no free radical initiator is apparently formed.

EXAMPLE III

Into 1,800 ml of water there was added 120 grams of ethylene-acrylic acid copolymer, containing about 20 weight percent of acrylic acid, and also 13 grams of sodium hydroxide to form a water soluble neutralization product. There was then taken a 350 ml aliquot of the above to which was added 40 grams of acrylonitrile and 40 grams of styrene. Subsequently, there was then added 3.2 ml of a 50 percent aqueous solution of hydrogen peroxide. Air was excluded by the use of a nitrogen blanket. With stirring the system was allowed to sit at room temperature after which an exotherm resulted. The system was then allowed to react at a temperature of about 47°C for about 1.9 hours. The product of the polymerization was isolated, by coagulating with HCl, washed, and dried, resulting in a 76 percent yield. Part of this isolated product was analyzed for its carbon, hydrogen, nitrogen, and oxygen content. This elemental analysis as set forth in Table I below, wherein this product is designated Isolated Product. Based on this analysis the composition of the polymer was calculated at about 23 weight percent acrylonitrile, about 39 percent styrene, and about 37 percent by weight calculated as ethylene-acrylic acid. Five grams of the product was partially extracted with tetrahydrofuran in a Soxhlet apparatus. The extraction was carried out until about one-half of the isolated product went into solution, although it appears that all of the material would eventually have dissolved in the solvent. The extracted solution was then dried to remove solvent and obtain an Extracted Product. The material which had not gone into solution in the time allowed was likewise recovered as a Residue Product. The residue product and the extracted product were then likewise submitted for elemental analysis. These analyses are set forth in Table I below.

TABLE I

| Product | ELEMENTAL ANALYSIS | | | |
|---|---|---|---|---|
| | % C | % H | % N | % O |
| Isolated Product | 81.81 | 8.45 | 6.19 | 3.32 |
| Residue Product | 82.10 | 8.58 | 5.38 | 3.73 |
| Extracted Product | 81.53 | 8.75 | 5.52 | 3.85 |

Within accepted limits of error these results indicate that the polymerization results in a chemical bonding and not in the formation of a physical combination. That is, the formation of a graft polymer is indicated.

Another 5 grams portion of the Isolated Product was stirred in a solution of 0.24 grams of sodium hydroxide (enough sodium hydroxide to exactly neutralize the ethylene-acrylic acid copolymer if it was present as a free copolymer and not chemically bound to the acrylonitrile-styrene copolymer) in 30 ml of water at about 90°C for about 30 minutes. The resulting slurry was filtered and the resulting filtrate acidified with hyrochloric acid forming a precipitate. The resulting precipitate (after acidification of the filtrate) was isolated and weighed 0.08 grams. Thus, while the original product contained 37 percent by weight as ethylene-acrylic acid only about 2 percent of the material was extractable by sodium hydroxide which indicates for all practical purposes the isolated product is a chemically combined form of an acrylonitrile-styrene copolymer with the ethylene-acrylic copolymer, that is, all of the foregoing indicates the formation of a graft polymer.

Further experimentation indicated that if the acrylonitrile was not present, no polymerization of styrene was realized. Similarly, when methyl methacrylate was substituted for styrene and no acrylonitrile employed, no polymerization resulted. Likewise, when polymerization was attempted in the manner described above, in the absence of the neutralization product, no polymerization resulted, indicating that hydrogen peroxide is not the initiating specie of itself. Similarly, the use of conventional emulsifying agent, namely Aquarex ME, instead of the neutralization product resulted in no polymerization. Finally, when the hydrogen peroxide was added to the neutralization product, prior to the addition of the styrene and acrylonitrile, no polymerization was indicated.

In the following examples a water soluble, copolymeric alkali metal salt of ethylene-acrylic acid was prepared by reacting sufficient sodium hydroxide with an ethylene-acrylic acid copolymer to form a water soluble salt. In these examples the specific copolymer employed was EAA–9300 from Union Carbide and Chemical Company, unless a contrary copolymer is indicated. This copolymer contains approximately 20 percent by weight of acrylic acid and has a melt index of about 50. Additionally, in these examples the amount of sodium hydroxide employed was one equivalent of hydroxide per equivalent of acid functionality i.e., 100 percent of the theoretical stoichiometric amount needed for complete neutralization was employed.

EXAMPLE IV

Into a nitrogen purged reaction flask was added 250 ml of water, 50 ml of a 20 percent by weight solution in water of the above copolymeric sodium salt of ethylene-acrylic acid, 30 grams of acrylonitrile and 10 grams of ethyl acrylate. Subsequently, there was then added 1.4 ml of a 50 percent hydrogen peroxide solution in water. With agitation the reaction flask set at room temperature and then exothermed. The exothermic nature of the reaction was controlled by cooling to maintain a temperature of 55°C and the reactants allowed to react at that temperature for about one-half hour. The cooling was then discontinued and after about 2 hours the temperature had dropped to room temperature. The graft polymer was then coagulated by the addition of hydrochloric acid, filtered, washed, and dried at reduced pressure. The dried product weighed about 41.2 grams and a round disk (or plaque) of the product was compression molded at 160°C, and 20,000 pounds platen pressure on a 12 × 12 inch press. The plaque showed good color stability. The film had an oxygen permeability of 3.54 cc. mil/100 in$^2$ day atm. (ASTM-D-1434-66).

EXAMPLE V

The procedure of Example IV was repeated except 25 ml of the 20 percent solution of the copolymeric sodium salt of ethylene acrylic acid was employed. The temperature was maintained in this experiment at 37°C until the reaction was substantially complete as evidenced by the reaction mass cooling to about room temperature. A polymer weighing about 36.2 grams was recovered by coagulation with HCl, washed, dried, and molded into a plaque. The plaque was clear, slightly yellow, had good flexural characteristics, and possessed good melt flow. The plaque showed a heat distortion temperature of about 71°C as measured by TMA (Thermal Mechanical Analysis) and had an oxygen permeability of 3.9 cc. mil/100 in$^2$ day atm.

EXAMPLE VI

In a manner like that of Example IV there was charged 25 ml of water, 50 ml of the copolymeric sodium salt of ethylene-acrylic acid, 60 grams of acrylonitrile, and 20 grams of ethyl arylate. There was then added 2.8 ml of a 50 percent by weight aqueous hydrogen peroxide solution and 1 ml of t-dodecylmercaptan. The reaction was then run at about 35°C for 2 hours. The recovered acid coagulated, washed and dried polymer weighed about 76.9 grams, and produced a clear plaque having a heat distortion temperature (TMA) of about 67°C, an oxygen permeability of about 3 cc. mil/100 in$^2$ day atm., and good flexural characteristics.

EXAMPLE VII

The procedure of Example IV was generally repeated except instead of employing 10 grams of ethyl acrylate, there was employed 10 grams of methyl methacrylate, and there was employed 0.5 ml t-dodecylmercaptan. A polymer was obtained in the amount of about 36.6 grams. It had a TMA heat distortion temperature of about 81°C and showed nondetectable oxygen permeability through a 5 mil film after 2 weeks of exposure, meaning the permeability was less than about 1.4 cc. mil/100 in$^2$ day atm.

EXAMPLE VIII

Into a nitrogen purged flask was added 200 ml of water, 100 ml of a 20 percent by weight solution of the copolymeric sodium salt of ethylene acrylic acid, 40 grams styrene, 10 grams of acrylonitrile. There was then added 4 ml of an aqueous 50 percent hyrogen peroxide solution. With agitation the mass was allowed to react at room temperature at which point an exotherm resulted. The exotherm resulted in a temperature of about 35°C and the mass was allowed to continue its reaction at that temperature with agitation until cooling to room temperature resulted. The solids were coagulated with HCl, filtered, cooled, and dried at reduced pressure. There was obtained about 59.7 grams of a polymer having a TMA heat distortion temperature of about 98°C. The material was compression molded into a plaque and qualitatively exhibited good melt flow and the plaque was very flexible and translucent.

EXAMPLE IX

The proceure of Example VIII was generally repeated except 40 grams of methyl methacrylate replaced the 40 grams of styrene. About 63.7 grams of polymer was obtained which had a TMA heat distortion temperature of about 91°C. A compression molded plaque was flexible, colorless, and transparent.

EXAMPLE X

Into a nitrogen purged resin flask there was added 200 ml of water, 20 ml of a 20 weight percent aqueous solution of the above described copolymeric sodium salt of ethylene-acrylic acid, 5 grams of acrylonitrile, 90 grams of methyl methacrylate, and 5 grams of styrene. To this reaction mass was added 4 ml of a 50 percent by weight aqueous hydrogen peroxide solution. The reaction was allowed to proceed at 40°C until complete as evidenced by cooling to room temperature. The product obtained weighed about 110 grams, had a TMA heat distortion temperature of about 103°C, and had a first glass transition temperature of about 57°C and a second glass transition temperature of about 99°C, based on DTA.

The materials obtained in accordance with Examples IV, V, VI, and VII, as indicated by their oxygen permeability, represent excellent materials to be used as protective envelopes around articles or materials sensitive to oxygen. The material obtained in Example VIII, IX, and X find utility as films or molded articles.

While the above describes the invention with sufficient particularity to enable those skilled in the art to make and use same and sets forth some of the best modes contemplated, it will be apparent that modification is possible.

I claim:

1. A process for producing a polymeric acrylonitrile acrylate-ethylene graft polymer comprising: combining, in water, a water soluble, copolymeric alkali metal salt of ethylene-acrylic acid with acrylonitrile and, optionally, a monoethylenically unsaturated polymerizable monomer selected from the group consisting of lower alkyl acrylates, lower alkyl methacrylates, vinyl aromatics, vinlyidene halides, vinyl halides, and mixtures thereof; releasing hydrogen peroxide into said combination in an amount sufficient to form a free radical initiator with said copolymeric alkali metal salt, thereby forming a polymerization system; polymerizing said system with the sole free radical polymerization initiator consisting of the reaction product of said hydrogen peroxide and said copolymeric alkali metal salt for a time and at a temperature sufficient to graft polymerize said acrylonitrile and, when present, said monoethylenically unsaturated monomer; recovering the polymerized product.

2. The process of claim 1 wherein, based on said copolymeric alkali metal salt, said acrylonitrile and said optional monomer, said copolymeric salt is employed in an amount of about 8 to about 60, said acrylonitrile is employed in an amount of about 4 to about 80, and said optional monomer is employed in the amount of 0 to about 88 percent by weight.

3. The process of claim 2 wherein said salt is employed in the amount of about 8 to about 25, said acrylonitrile in the amount of about 60 to about 80, and wherein said optional monomer is ethyl acrylate, which is employed in an amount of about 5 to about 25 percent by weight.

4. The process of claim 2 wherein said optional monomer is methyl methacrylate, and wherein said salt is employed in an amount of about 8 to about 25, said acrylonitrile in an amount of about 60 to about 80, and said methyl methacrylate in an amount of about 5 to about 25 percent by weight.

5. The process of claim 2 wherein said optional monomer is styrene and said salt is employed in an amount of about 8 to about 25, said acrylonitrile in an amount of about 60 to about 80, and said styrene in an amount of about 5 to about 25 weight percent.

6. The process of claim 1 wherein said copolymeric alkali metal salt is a sodium salt.

7. The process of claim 6 wherein said salt is a neutralization product of sodium hydroxide and a copolymer of ethylene-acrylic acid.

8. The process of claim 7 wherein said copolymer of ethylene-acrylic acid has a melt index of between about 25 to about 500.

9. The process of claim 8 wherein said copolymer of ethylene-acrylic acid is a copolymer of about 75 weight percent to about 82 weight percent ethylene, and about 18 weight percent to about 25 weight percent acrylic acid.

10. A process for producing a polymeric acrylonitrile acrylate-ethylene graft polymer product comprising: combining acrylonitrile and a monomer from the group consisting of $C_1$ to $C_2$ alkyl acrylates, $C_1$ to $C_2$ alkyl methacrylates, styrene, vinyl chloride, vinylidene chloride and mixtures thereof, in water with a water soluble alkali metal salt of an ethylene-acrylic acid copolymer; adding hydrogen peroxide to said combination in an amount sufficient to form a free radical initiator with said salt, graft polymerizing said acrylonitrile and said monomer with the sole initiator consisting of the reaction product of said hydrogen peroxide and said salt; and recovering said polymeric product.

11. The process of claim 10 wherein said alkali metal is sodium.

12. The process of claim 10 wherein said monomer is a $C_1$ to $C_2$ alkyl acrylate.

13. The process of claim 10 wherein said monomer is a $C_1$ to $C_2$ alkyl methacrylate.

14. The process of claim 10 wherein said monomer is styrene.

15. The process of claim 12 wherein said monomer is ethyl acrylate.

16. The process of claim 13 wherein said monomer is methyl methacrylate.

17. The process of claim 11 wherein said monomer is styrene.

18. A process for producing a polymeric acrylonitrile acrylate-ethylene graft polymer comprising: reacting a copolymer of ethylene and acrylic acid with sodium hydroxide so as to form a water soluble neutralization product; combining at least part of said neutralization product with acrylonitrile and, optionally, a monomer selected from the group consisting of $C_1$–$C_2$ alkyl acrylates, $C_1$–$C_2$ alkyl methacrylates, styrene, and mixtures thereof in water so as to form an aqueous polymerizable system consisting essentially of the following amounts of reactants, about 8 to about 60 weight percent of said neutralization product, about 4 to about 80 percent by weight acrylonitrile and 0 to about 88 weight percent of said monomer; adding hydrogen peroxide in an amount sufficient to form a free radical initiator with said neutralization product; allowing said acrylonitrile and said optional monomer to graft polymerize with the sole polymerization initiator consisting of the reaction product of said hydrogen peroxide and said neutralization product, and recovering the polymerized product.

19. The process of claim 18 wherein said amounts are about 8 to about 25 percent neutralization product, about 60 to about 80 percent acrylonitrile, and about 5 to about 25 percent by weight of said monomer.

* * * * *